US005493666A

United States Patent [19]
Fitch

[11] Patent Number: 5,493,666
[45] Date of Patent: Feb. 20, 1996

[54] MEMORY ARCHITECTURE USING PAGE MODE WRITES AND SINGLE LEVEL WRITE BUFFERING

[75] Inventor: Jonathan M. Fitch, Cupertino, Calif.

[73] Assignee: Apple Computer, Inc., Cupertino, Calif.

[21] Appl. No.: 371,448

[22] Filed: Jan. 11, 1995

Related U.S. Application Data

[63] Continuation of Ser. No. 113,503, Aug. 27, 1993, abandoned, which is a continuation of Ser. No. 495,836, Mar. 19, 1990, abandoned.

[51] Int. Cl.$^6$ .................................................. G06F 12/08
[52] U.S. Cl. ........................... 395/445; 364/DIG. 1; 364/243.41; 364/254.3; 364/238.4
[58] Field of Search ................................... 395/400, 425

[56] References Cited

U.S. PATENT DOCUMENTS

| | | | |
|---|---|---|---|
| 4,847,758 | 7/1989 | Olson et al. | 395/425 |
| 4,926,385 | 5/1990 | Fujishima et al. | 365/230.03 |
| 4,933,910 | 6/1990 | Olson et al. | 365/238.5 |
| 5,034,917 | 7/1991 | Bland et al. | 364/900 |
| 5,036,460 | 7/1991 | Takahira et al. | 395/425 |
| 5,051,889 | 9/1991 | Fung et al. | 395/425 |
| 5,113,511 | 5/1992 | Nelson et al. | 395/425 |
| 5,159,676 | 10/1992 | Wicklund et al. | 395/425 |
| 5,303,364 | 4/1994 | Mayer et al. | 395/425 |

FOREIGN PATENT DOCUMENTS

| | | |
|---|---|---|
| 0398191 | 11/1990 | European Pat. Off. . |
| 2217066 | 10/1989 | United Kingdom . |

*Primary Examiner*—Eddie P. Chan
*Assistant Examiner*—Hiep T. Nguyen
*Attorney, Agent, or Firm*—Blakely, Sokoloff, Taylor & Zafman

[57] ABSTRACT

A memory architecture including a memory cache which uses a single level of write buffering in combination with page mode writes to attain zero wait state operation for most memory accesses by a microprocessor. By the use of such a memory architecture, the speed advantages of more expensive buffering schemes, such as FIFO buffering, are obtained using less complex designs. The memory architecture utilizes same page detection logic and latching circuitry and takes advantage of a feature built into industry standard dynamic RAMs, namely page mode writes, to perform writes to memory which allow the processor to be freed before the write is completed for the most frequently occurring type of write operations.

8 Claims, 6 Drawing Sheets

MEMORY ARCHITECTURE USING PAGE MODE WRITES AND SINGLE LEVEL WRITE BUFFERING

This is a continuation of application Ser. No. 08/113,503 filed Aug. 27, 1993, now abandoned, which is a continuation of application Ser. No. 07/495,836 filed Mar. 19, 1990, now abandoned.

SUMMARY OF THE INVENTION

A memory architecture including a memory cache is disclosed which uses a single level of write buffering in combination with page mode writes to attain zero wait state operation for most memory accesses by a microprocessor. In this manner, the present invention attains the speed advantages of more expensive buffering schemes, such as FIFO buffering, for a lower cost. The invention utilizes same page detection circuitry and takes advantage of a feature built into industry standard dynamic RAMs, namely page mode writes, to perform writes to memory which allow the processor to be freed before the write is completed for the most frequently occurring type of write operations. Thus, while it may not be possible to free the processor for all write operations, since the most frequently occurring write operations, i.e., sequential writes, can be performed by using page mode writes, a performance increase can be realized at minimal additional cost.

DETAILED DESCRIPTION OF THE INVENTION

Figure 1:
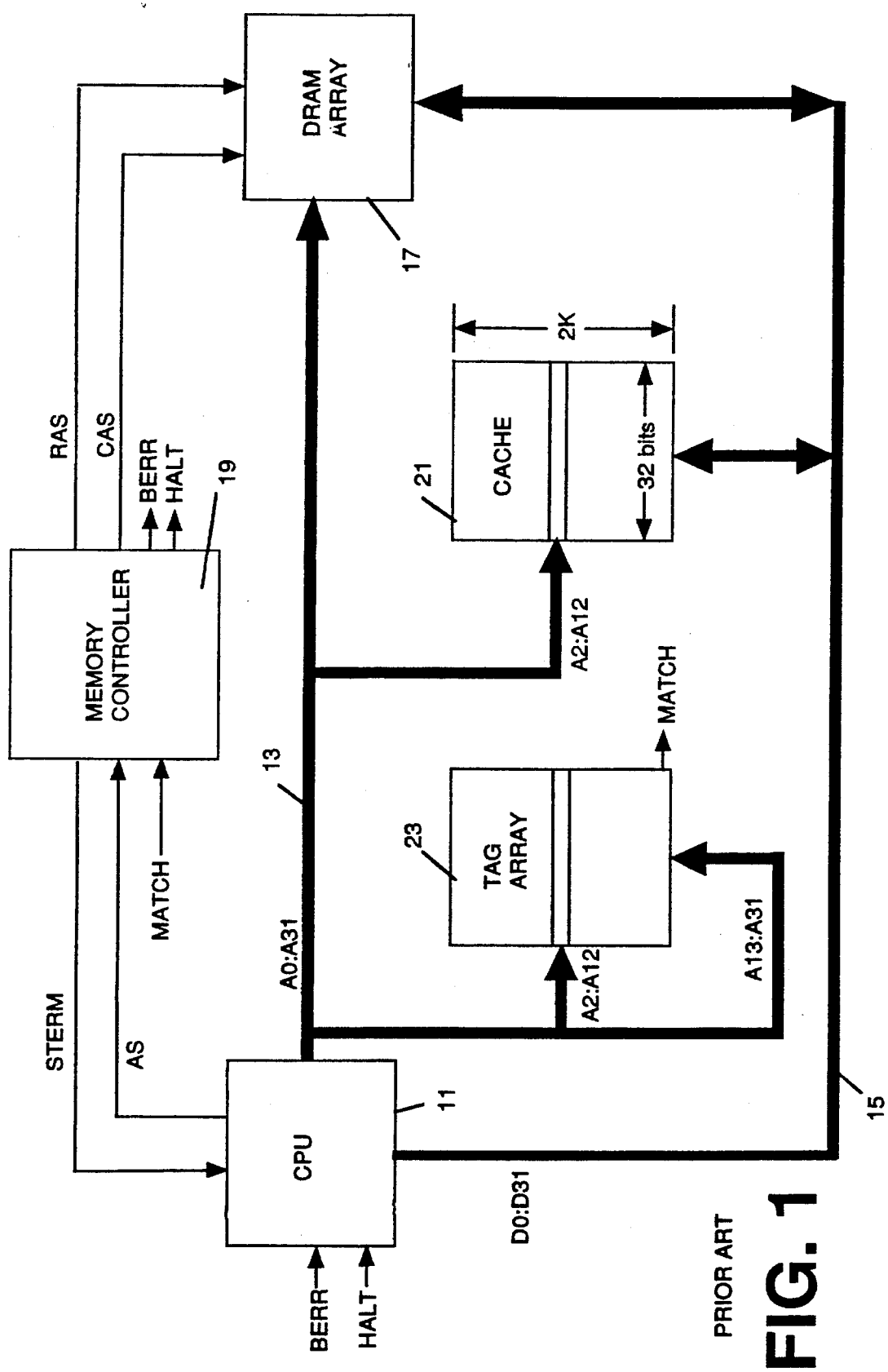
FIG. 1 is a block level diagram of a prior art memory system with a write through cache.

Write buffering is a technique which requires the use of additional circuitry for improving memory write performance. In particular, a microprocessor must normally wait for a write to memory to be completed before the microprocessor is released to process other data. However, if write buffering is provided, buffers are used to temporarily store the information which is to be written into memory until the actual write to memory is completed. By using write buffering, the microprocessor can be released to process other data before the write to memory operation is completed. A problem which occurs when using this technique is that if the next action of the microprocessor is another write to memory, the processor must then be held in a wait state until the information in the buffer has been written to memory, in which case the speed advantage is lost for that operation, or a FIFO buffering scheme must be implemented to store a number of writes.

However, FIFO buffering is expensive in terms of circuitry. It is also complex due to the possibility that the processor or some other direct memory access (DMA) device may attempt to reread a piece of data which is pipelined in the FIFO buffer, but not yet in memory.

As noted above, with just a single level of buffering, while not as expensive as FIFO buffering, the microprocessor would be held off each time a write is still pending in the buffer when another write is needed. However, in many microprocessor architectures (such as Motorola), it is highly undesirable to hold off the microprocessor during such writes because of the preponderance of strings of back to back writes, guaranteeing many holdoffs which would therefore eliminate any overall performance gain. In these architectures, writes tend to be many words having sequential addresses (such as stack operations) or in pairs of sequential accesses (such as misaligned long word writes). Writes that are back to back and not sequential in address are rare, because to occur, either extra address calculations must be performed or extra instructions must be fetched and processed. However, in both of these cases the writes are separated by processing time during which no write operations are performed.

RAM memory is organized into ranges of addresses called pages which typically are 1,024 bytes long. Dynamic RAMs now standard in the industry allow a mode called 'page-mode writes' in which once started, data can be written to the same memory page much faster than for random accesses to the RAM. Sequential addresses which can be written to using page-mode writes are always within the same memory page unless they cross a page boundary. However, this page boundary crossing happens only once in every 1,024 accesses, assuming 1,024 byte pages.

However, by combining a single level of write buffering with same page detection circuitry and page-mode write capability, optimal write performance for most writes can be achieved for a relatively low cost. The write buffer allows the processor to be released from the first write while the page-mode memory access is being started. The address must be latched since it will no longer exist on the microprocessor bus as soon as the microprocessor is released. If the next bus cycle is a write, the address on the address bus is compared with the address in the latches by the same page detection circuitry. If the new address is in the same page as the old, the new data can be page-mode written at very high speed. This can be continued until either the string of writes is broken by a read or idle states, or the page boundary is crossed. The cost of circuitry to achieve this level of performance is far less than the equivalent achieved through either memory fast enough to absorb the writes or a FIFO buffering scheme and its associated complexity.

When the foregoing circuit improvements are combined with a memory cache, significant simplification can be achieved in the design of the memory cache. The design simplifications which occur may be explained as follows. Cache memory systems can be split into two general categories: 1) write-through and 2) copy-back. In the write-through scheme, data is always written to memory simultaneously with updating the cache to the new data contents. This eliminates the possibility of cache incoherency, a situation in which the contents of memory and cache differ for the same address. The disadvantage of this technique is that writing speed is determined by memory speed, not cache speed, negating some of the performance advantage of a memory cache.

In the copy-back scheme, data is written only to the cache, taking advantage of the higher writing speed to the faster cache memory. The data in cache is written to memory only during a cache flush or when a cache location is reused. Generally, there is a time penalty for reads that miss the cache, i.e., accesses to data or instructions which are not in the cache, because if the cache line that is to be used for the new data has been altered by a write (called a 'dirty' line), it must be written to memory ('copied back') before the read can proceed. The hope is that the improved write performance more than offsets the loss caused by cache misses. Before the dirty line is copied-back, the contents of memory and the corresponding cache data differ for that address. Thus, if the architecture also supports DMA, additional hardware or software is needed to inspect or snoop the cache during DMA operations, otherwise stale data may be read or new data overwritten. For these reasons, the copy-back cache is usually a higher performing technique as compared to a write through cache, but it is significantly more costly.

With the buffered-write, page mode write combination of the present invention, writes to memory are usually accomplished with no wait states (like the copy-back scheme), but reads are not slowed by having to copy-back to the memory, since the data has already been written to memory. Thus, the much simpler write through cache will actually outperform the copy-back cache in this system, at lower cost.

Referring now to FIG. 1, a typical prior art memory cache architecture is shown comprising a CPU 11 having an address bus 13, data bus 15 for accessing a random access memory, i.e., DRAM array 17. Data on data bus 15 is written to memory 17, or data from memory 17 is read and placed onto bus 15 using the address on the address bus 13 under control of memory controller 19 which generates row address strobe (RAS) signals and column address strobe (CAS) signals in accordance with techniques well known in the art. A typical write through cache comprising cache 21 and tag array 23 are also shown wherein for a 2K cache, cache 21 is addressed by bits A2:A12 on the 32 bit (A0:A31) address bus, and cache hits and misses are determined using tag array 23 which stores the high order A13:A31 bits from the address bus. The tag array asserts the signal Match when the address on the address bus (except possibly for the low order bits A0:A1 which determine only one of four bytes in a 32 bit word) matches the data in the tag array pointed to by bits A2:A12 of the address on the address bus. The signals Berr and Halt are signals generated by tag array in accordance with the requirements of the Motorola 68xxx family of microprocessors which use a memory cache as defined in specifications available from Motorola Corporation and should be familiar to persons skilled in the field of the invention. In this connection, the details concerning the generation and use of these signals, other details of a memory cache architecture which are not shown in FIG. 1, and details for implementing memory controller 19 will be readily apparent to persons skilled in the art and are not needed for a complete understanding of the present invention. Further, FIG. 1 is provided only as a reference to show changes made to a prior art memory architecture using a memory cache to implement the present invention.

Figure 2:
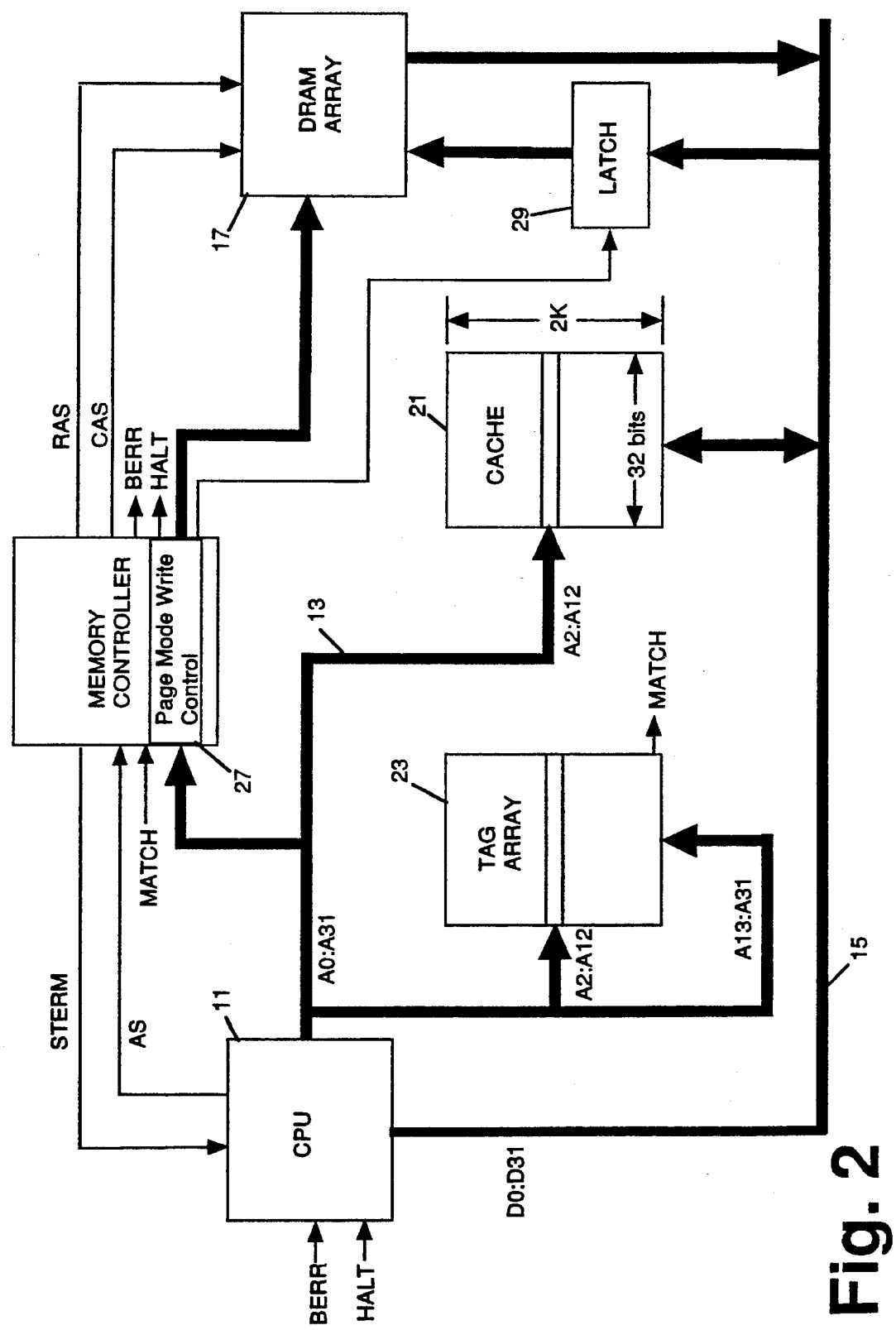
FIG. 2 is a block level diagram of a memory system according to the present invention.

In this connection, as shown in FIG. 2, the present invention modifies the prior art memory architecture by modifying memory control 19 to include page mode write control logic 27 and latch 29 between data bus 15 and DRAM array 17 which provides a single level of write buffering.

Latch 29 is simply a 1 by 32 bit transparent latch which latches the data D0:D31 on data bus 15 when the signal LData is asserted by page mode write control 27 as described below.

Same page detection logic latches the high order A13:A31 bits on address bus 13 for write operations and compares such bits with the high order address latched from an immediately prior write operation. If there is a match, then the two writes are to the same page and the data can be written to memory as a page mode write as described above. If the addresses do not match, then the data is written to the cache and written through to memory, after being buffered by latch 29 in the usual manner as is well known in the art.

Figure 3:
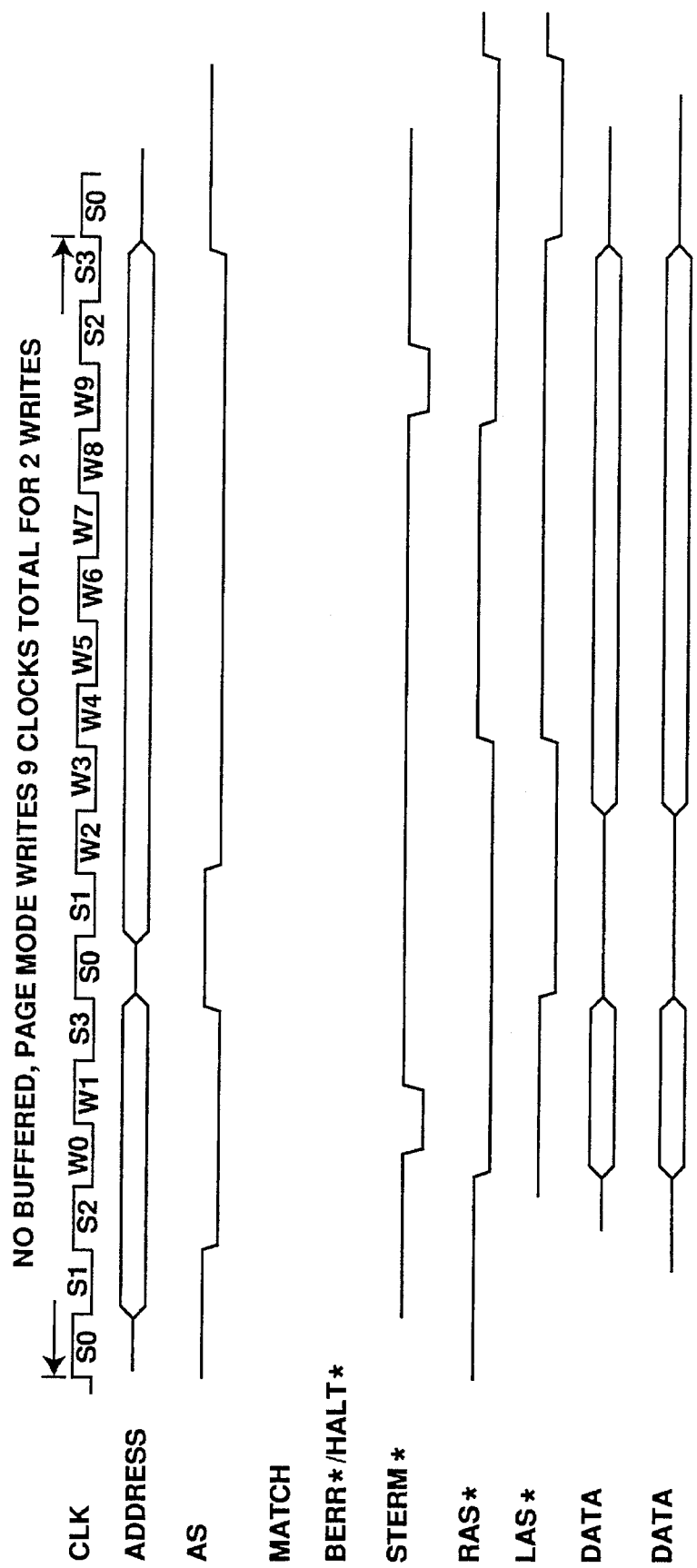
FIG. 3 is a timing diagram of a non-buffered prior art page mode write cycle.
Figure 4:
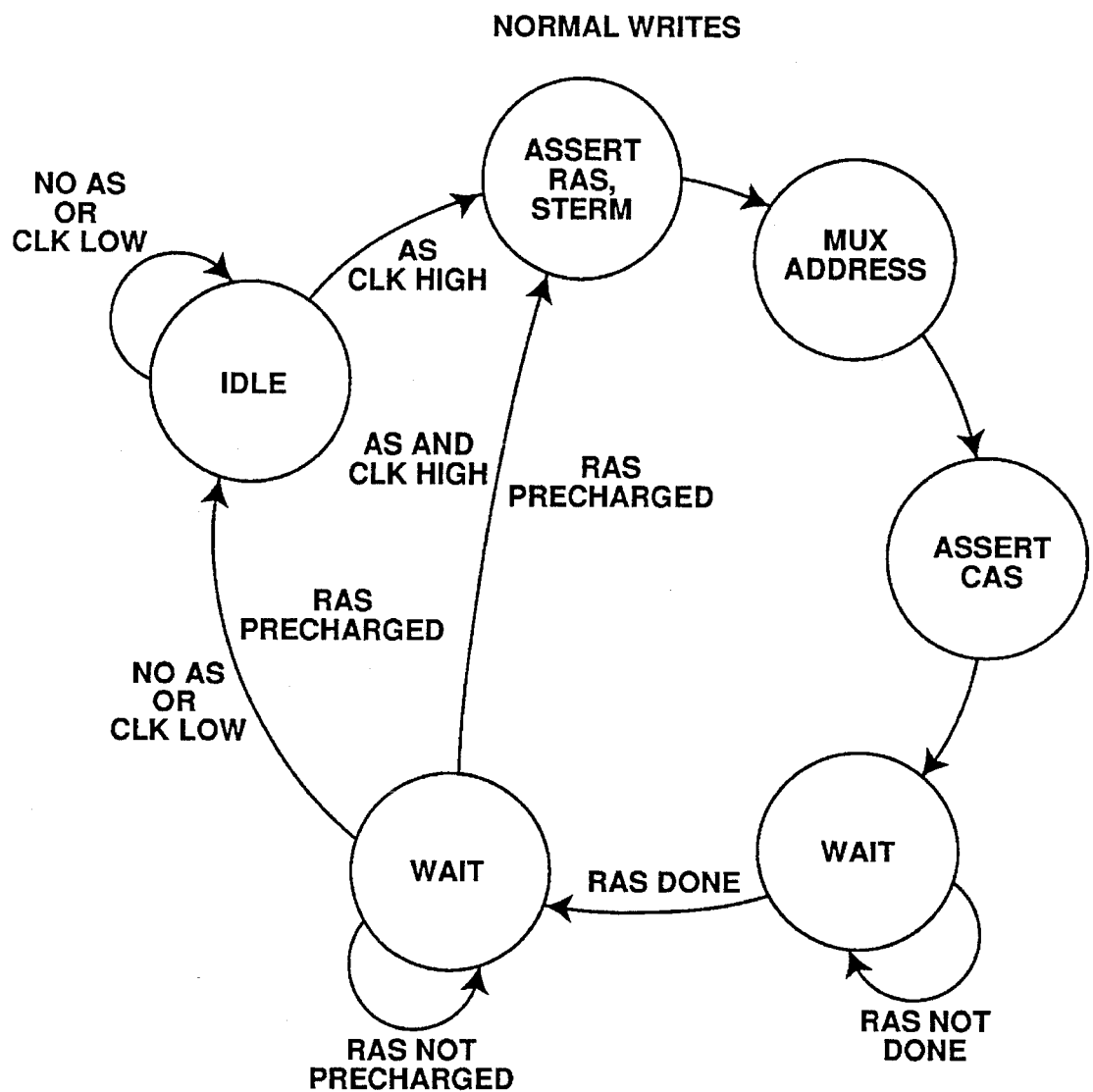
FIG. 4 is a state machine diagram of state machine for use with non-buffered prior art page mode writes.

Same page detection logic and page mode write logic may be implemented using finite state machine techniques. In this connection, the implementation and operation of same page detection logic and page mode write logic will be described with reference to FIG. 5 which is a timing diagram of a buffered page mode write cycle according to the present invention, and FIG. 6 which is a state machine for use with buffered page mode writes according to the present invention. FIG. 3 which is a timing diagram of a non-buffered prior art page mode write cycle, and FIG. 4 which is a state machine diagram of a state machine for use with non-buffered prior art page mode writes are provided to further show and explain the differences between the present invention and the prior art.

Figure 5:
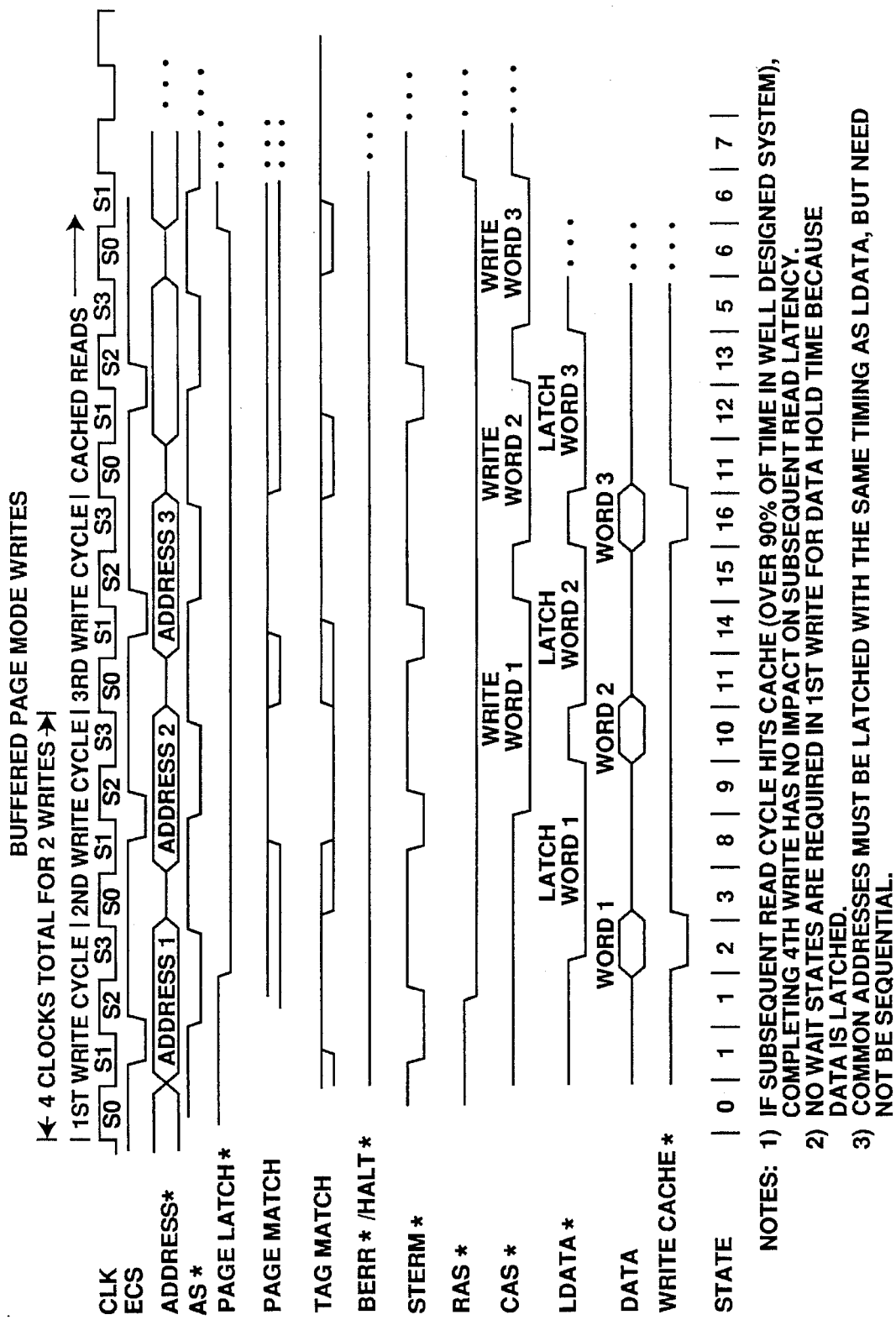
FIG. 5 is a timing diagram of a buffered page mode write cycle according to the present invention.
Figure 6:
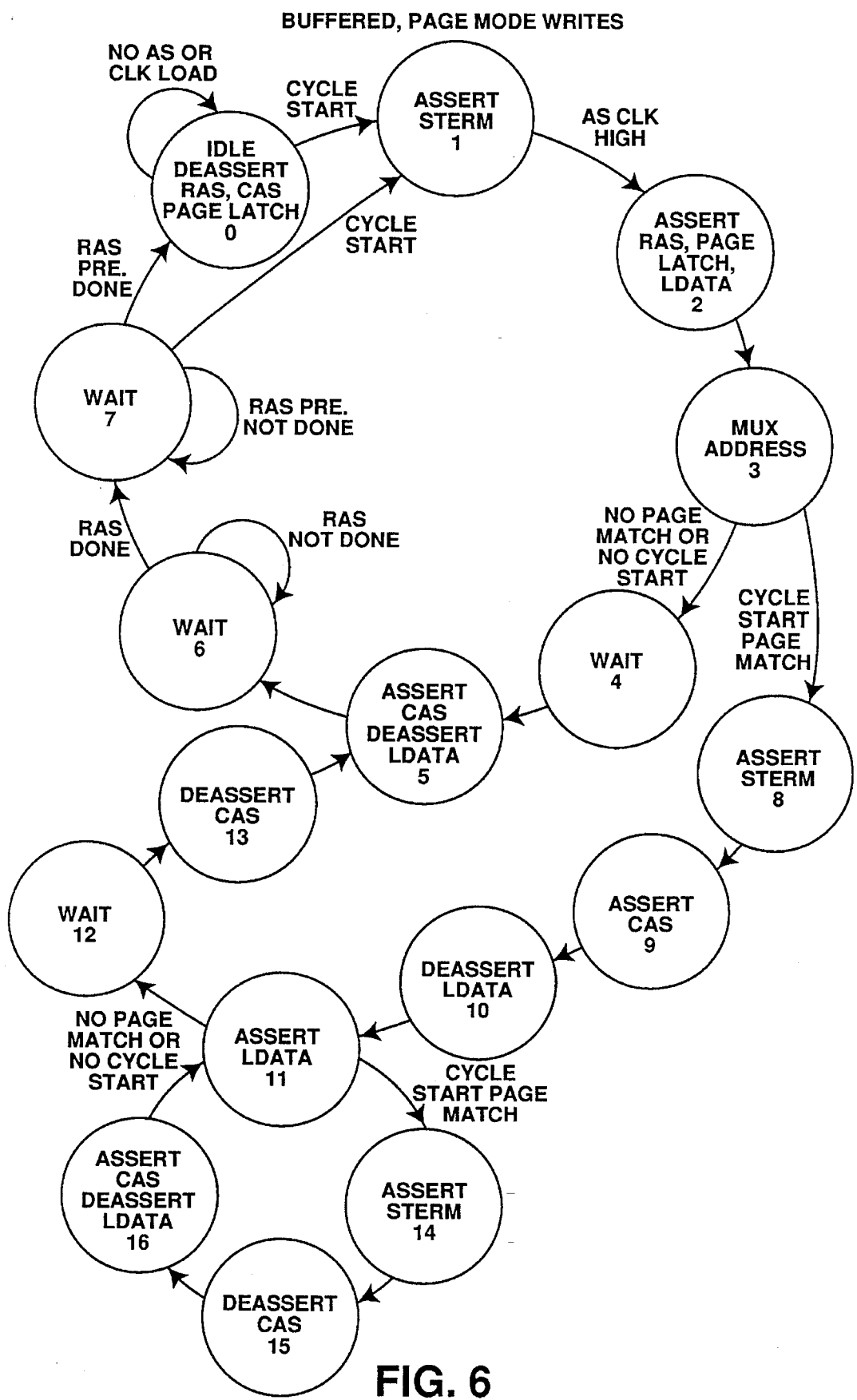
FIG. 6 is a state machine diagram of state machine for use with buffered page mode writes according to the present invention.

Referring now to FIGS. 2, 5 and 6 and assuming a Motorola 68030 processor operation environment, the details of which are well known to persons skilled in the art of the invention, hardware is required to latch the row addresses with the Page Latch signal, the column addresses with the Ldata signal, and the data with the Ldata signal. Also required is hardware to compare the contents of the row address latch with the current row addresses, the result to drive the Page Match signal. The state diagram of FIG. 6 is an implementation of such hardware and itself can be implemented with well known finite state machine techniques.

As shown in FIG. 6, starting in idle state 0, a cycle start is detected by observing Early Cycle Start (ECS), causing a transition to state 1. With the CLK in a high state, Address Strobe (AS) is known to be valid and if asserted, causes the transition to state 2. In this state, the memory cycle is started by latching the current page address, latching the data, and asserting Row Address Strobe (RAS). The transition to state 3 is unconditional, in which the addresses are multiplexed from row addresses to column addresses. If another ECS is observed, indicating along with other bus control signals the beginning of another write, and if the Page Match signal is true, indicating the current access is in the same page as the first access, a transition to state 8 occurs. Sterm is asserted in this state to acknowledge a no-wait-state cycle. The transition to state 9 occurs unconditionally, in which Column Address Strobe (CAS) is asserted to the RAM, latching the first word into the RAM input latches. The transition to state 10 is also unconditional. In this state, Ldata is reasserted, opening the data latches for word 2, word 1 having been latched by the RAM. Proceeding unconditionally to state 11, Ldata is reasserted to latch word 2. If another write cycle is observed to start in the same page (ECS and Page Match asserted), a transition to state 14 occurs, where Sterm is asserted for a no-wait-state cycle. State 8 cannot be re-used for this purpose due to differences in CLK, CAS, and Ldata relationships stemming from differences between the first RAM access and subsequent page-mode accesses. The transition from state 14 to state 15 is unconditional and CAS is deasserted, the word 1 write having been completed. The transition to state 16 is also unconditional, and CAS is asserted to page-mode write word 2. Ldata deasserted to allow word 3 data to propagate. The transition back to state 11 is unconditional, in which Ldata is asserted to latch word 3 data. At this point in the example, if no ECS is observed, or if Page Match is not true, or if ECS is observed, but the cycle is not a write cycle, or not a cycle to memory, a transition to state 12 occurs, allowing completion of word 2 write. State 13 follows unconditionally, deasserting CAS, followed unconditionally by state 5. Here, CAS is asserted to begin writing word 3, and Ldata may be deasserted as the RAM input latches latch the data. The transition to state 6 is unconditional, and allows the RAS - CAS overlap timing to be satisfied. The transition to state 7 can then occur, and the state machine remains in state 7 until the RAS precharge requirements have been satisfied. If another memory write were indicated by bus control signals, a transition to state 1 would occur, otherwise a transition back to state 0 would take place and all signals are returned to their initial condition.

Assuming a cache based memory system, the completion of the last write and the RAS precharge interval would most likely be overlapped with reads from the cache, provided that the bus structure is such that the cache data bus and latched write data bus are not in conflict.

I claim:

1. A memory system having an address bus and a data bus coupled to a dynamic random access memory array, a memory cache coupled to said address bus and said data bus, a tag array coupled to said address bus and a memory controller coupled to a central processing unit and said dynamic random access memory array, said memory system comprising:

a) page mode write control means coupled to said address bus and said memory controller for controlling writes of data on said data bus to said dynamic random access memory array which are within a predetermined memory page;

b) same page detection logic means for determining whether consecutive writes of data on said data bus to said dynamic random access memory array are within said predetermined memory page and generating a latch control signal for latching data on said data bus;

c) latch means coupled to said dynamic random access memory array, said data bus, said page mode write control means and said same page detection logic means for latching data from said data bus which is to be written to said dynamic random access memory array using said latch control signal; said page mode write control means, said latch control signal and said latch means cooperatively operating to provide a single level of write buffering.

2. The memory system defined by claim 1 wherein said same page detection logic means latches predetermined high order bits on said address bus for write operations and compares the latched high order bits with predetermined high order bits latched from an immediately prior write operation.

3. The memory system defined by claim 2 wherein said same page detection logic means generates control signals causing data on the data bus to be written to said memory cache when said compared bits do not match, said control signals causing data on the data bus to be written to said dynamic random access memory array as a page mode write when said two latched predetermined high order bits do match.

4. The system defined by claim 1 wherein said same page detection logic means comprises a finite state machine.

5. The system defined by claim 1 wherein said page mode write control means comprises a finite state machine.

6. A method for controlling the operation of a memory system having an address bus and a data bus coupled to a dynamic random access memory array, a memory cache coupled to said address bus and said data bus, a tag array coupled to said address bus and a memory controller coupled to a central processing unit and said dynamic random access memory array, said method comprising the steps of:

a) controlling writes of data on said data bus to said dynamic random access memory array which are within a predetermined memory page;

b) determining whether consecutive writes of data on said data bus to said dynamic random access memory array are within said predetermined memory page and generating a latch control signal for latching data on said data bus;

c) latching data from said data bus which is to be written to said dynamic random access memory array using said latch control signal to provide a single level of write buffering.

7. The method defined by claim 6 wherein said determining step comprises the steps of:

a) latching predetermined high order bits on said address bus for write operations; and b) comparing the latched high order bits with predetermined high order bits latched from an immediately prior write operation.

8. The method defined by claim 7 wherein said determining step comprises the step of:

generating control signals which cause data on the data bus to be written to said memory cache when said compared bits do not match, and which cause data on the data bus to be written to said dynamic random access memory array as a page mode write when said compared bits do match.

* * * * *